United States Patent [19]

Takahashi et al.

[11] Patent Number: 4,674,828

[45] Date of Patent: Jun. 23, 1987

[54] LIGHT-CONDUCTIVE CIRCUIT UNIT INCLUDING LIGHT DEFLECTING MEANS AND OPTICAL SWITCHING MEANS

[75] Inventors: Fumitaka Takahashi, Tokyo; Yoshihiko Kimura, Saitama; Hideo Tsubata, Saitama; Nobuaki Oji, Saitama; Minoru Mohri, Saitama, all of Japan

[73] Assignee: Honda Giken Kogyo Kabushiki Kaisha, Tokyo, Japan

[21] Appl. No.: 777,246

[22] Filed: Sep. 18, 1985

[30] Foreign Application Priority Data

Sep. 18, 1984 [JP] Japan .................................. 59-195461

[51] Int. Cl.⁴ ................................................ G02B 6/12
[52] U.S. Cl. .............................. 350/96.13; 350/96.15; 350/96.19
[58] Field of Search ............... 350/96.13, 96.14, 96.15, 350/96.20, 96.19, 96.18

[56] References Cited

U.S. PATENT DOCUMENTS 4,580,873  4/1986  Levinson ........................... 350/96.20

FOREIGN PATENT DOCUMENTS 0156552  12/1979  Japan ................................. 350/96.16
55-22723  2/1980  Japan ................................. 350/96.15
56-19002  2/1981  Japan ................................. 350/96.15

OTHER PUBLICATIONS

Minowa et al, "Nonblocking 8×8 Optical Matrix Switch . . . ", *Electronics Lett.*, vol. 16, No. 11, May 1980, pp. 422-423.
Brinton, J. B., "Back-to-Back Prisms Form Matrix Switch", Electronics, Feb. 10, 1982, pp. 42-46.
Oda, Miyao et al, "Mechanically Operated Optical Matrix Switch", Fujitsu Science & Technology Journal (Japan) vol. 17, No. 3, pp. 121-138 (9-1981).

*Primary Examiner*—John Lee
*Attorney, Agent, or Firm*—Irving M. Weiner; Joseph P. Carrier; Pamela S. Burt

[57] ABSTRACT

A light-conductive circuit unit comprises a substrate (1) made of an optical material, the substrate (1) having a light inlet surface (1a) for letting in a beam of light from a light source (2a to 2c), a light outlet surface (1b) for letting out a beam of light to a light-receiving element (3a to 3g), and a light-conductive path (4a to 4h) constituted with a part of the substrate to conduct rays of light from the light inlet surface (1a) to the light outlet surface (1b), and a combination of light course turning parts (5a to 5g) and optical switching mechanisms (6a to 6e) both substantially integrated with the substrate (1).

4 Claims, 5 Drawing Figures

LIGHT-CONDUCTIVE CIRCUIT UNIT INCLUDING LIGHT DEFLECTING MEANS AND OPTICAL SWITCHING MEANS

BACKGROUND OF THE INVENTION

1. Field of the Invention

The present invention generally relates to a light-conductive circuit unit. More particularly, the invention relates to a light-conductive circuit unit adapted for use in optical transmission systems of a multiplex type to be installed in vehicles.

2. Description of Relevant Art

As an implement for transmitting a set of signals for controlling various electrical loads such as an audio device equipped in a vehicle, a variety of signal transmission systems of the optical type; which transmits an optical signal instead of electrical signal, have been proposed in recent years.

In those optical signal transmission systems, there were employed a variety of types of light-conductive circuits including a light-conductive member such as an optical fiber for transmitting a beam of light from a light source, and an optical switch provided in a light-conductive route of the light-conductive member. The optical switch is adapted to selectively transmit and interrupt the light beam from the light source to thereby produce an optical signal.

Among those optical transmission systems, there were found a number of multiple transmission systems of a multi-wavelength type in which the light beam as generated at the light source consisted of rays of light having a plurality of predetermined, different wavelengths. In those multiple transmission systems, the light-conductive circuit was such that the number of optical switches needed to be provided was equal to the number of the different wavelengths of the rays of light from the light source, which switches were connected in series or parallel in the light-conductive route. Exemplarily, three optical switches were provided where the light beam as generated at the light source included three types of rays of light having difference wavelengths: red-colored, green-colored, and blue-colored.

As such a light-conductive circuit, there were two typical examples disclosed. One in Japanese Patent Application Lay-Open Print No. 56-8103, laid open on Jan. 27, 1981, and the other in Japanese Patent Application Lay-Open Print No. 56-149840, laid open on Nov. 19, 1981. Of the two examples, each had three different wavelengths in the beam of light from a light source: the former having disposed a set of three optical switches in a light-conductive route, connected together in series; the latter also having disposed a set of three optical switches in a light-conductive route, while connected together in parallel.

Incidentally, in comparison with signal transmission systems of the electrical type which transmit electrical signals, the optical signal transmission systems of the class described had many advantages; such as that these were hardly affected by external noises and also structurally simplified.

However, in the optical transmission systems of the multi-wavelength type described, the light-conductive circuit was necessarily constituted as a combination of a number of separated optical switch elements, a number of optical lines consisting of optical fibers, and a variety of elements for optical connection such as between the optical switch elements and the optical fibers as well as among the optical fibers, exemplarily, such as an optical lens and an optical branching filter.

As a result, the light-conductive circuits had a complicated fabrication process, particularly when many optical switches were provided.

Moreover, at the connection between such components, it was difficult to sufficiently prevent the leakage of light, thus resulting in the problem of reduction in the light transmission efficiency of the entirety of such transmission systems.

The present invention has been achieved to effectively overcome such problems of conventional light-conductive circuits in the optical signal transmission system of the class described.

SUMMARY OF THE INVENTION

According to the present invention there is provided a light-conductive circuit unit (100, 200) comprising: a substrate (1; 201) made of an optical material; the substrate (1; 201) having a light inlet surface (1a) for letting in a beam of light from a light source (2a to 2c), a light outlet surface (1b) for letting out a beam of light to a light-receiving element (3a to 3g), and a light-conductive path (4a to 4h) constituted with an internal part of the substrate (1; 201) to conduct rays of light from the light inlet surface (1a) to the light outlet surface (1b); and, among light course turning means (5a to 5g) and optical switching means (6a to 6e) each respectively disposed in the light-conductive path (4a to 4h), at least two of the means (5a to 5g, 6a to 6e).

Accordingly, an object of the present invention is to provide a light-conductive circuit unit in which respective fundamental elements of an optical circuit to be used in an optical signal transmission system are joined together to be united, to thereby possibly achieve facilitation as well as simplification of the fabrication of such circuit, while securing necessary light transmission efficiency of the unit itself as well as of the entirety of the optical signal transmission system.

The above and further features, objects and advantages of the present invention will more fully appear from the following detailed description of preferred embodiments of the invention when the same are read in conjunction with the accompanying drawings.

DETAILED DESCRIPTION OF THE PREFERRED EMBODIMENTS

Figure 1:
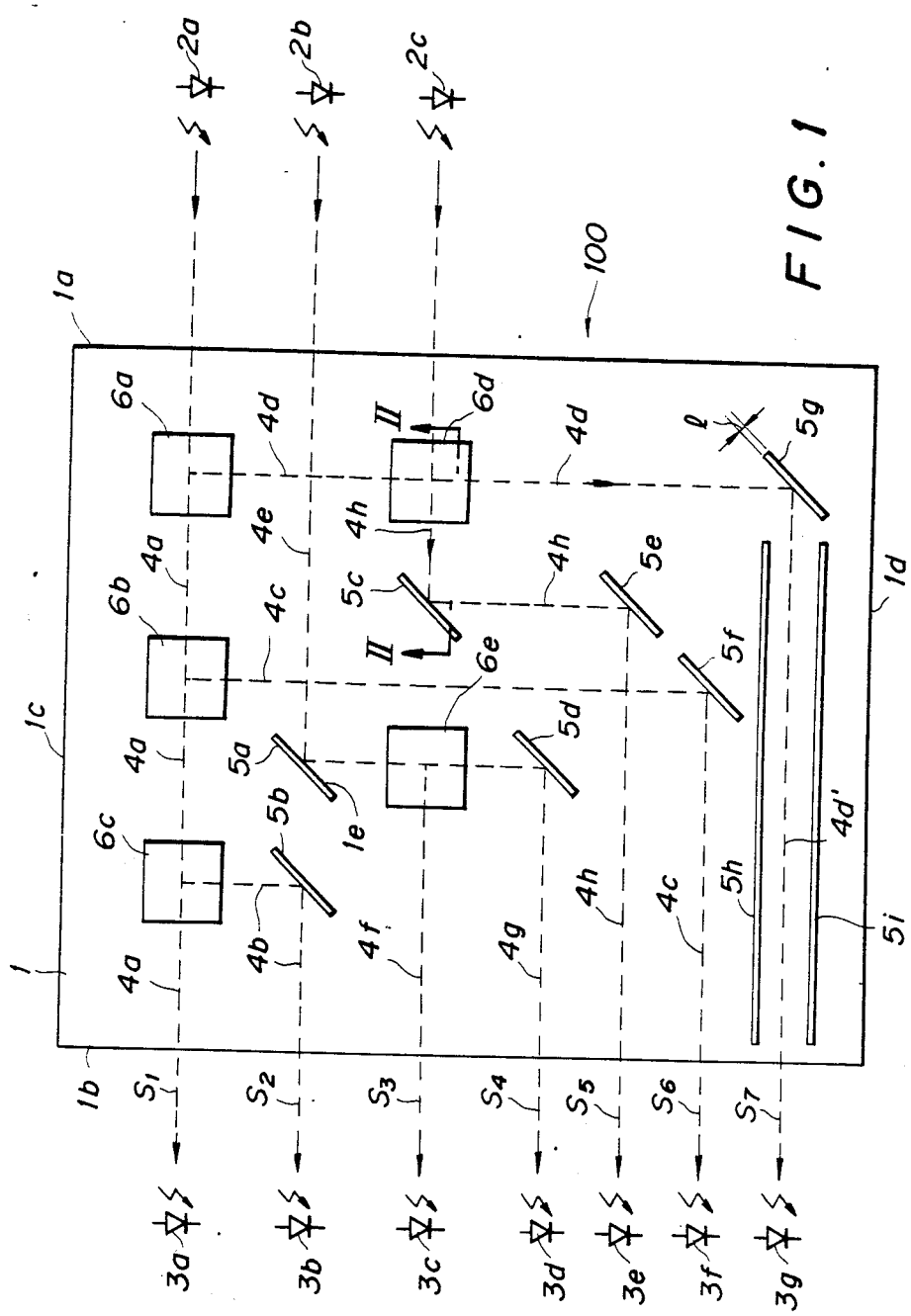
FIG. 1 is a schematic plan view of a light-conductive circuit unit according to a preferred embodiment of the present invention.

Referring first to FIG. 1, designated at reference numeral 100 is the entirety of a light-conductive circuit unit according to a first embodiment of the present invention. The circuit unit 100 comprises a light-conductive member 1 made of an optical material, which member 1 is adapted to serve as a base plate of the unit 100, that is, as a substrate thereof, while it has a flat square form of an even thickness. In this embodiment, the light-conductive member 1 has at the right side thereof in FIG. 1 a side face 1a as a surface adapted to receive or let in rays of light, and at the left side thereof a side face 1b as a surface adapted to let out or project rays of light. In this respect, the member 1 may have either a top side face 1c or a bottom side face 1d thereof serve as a light inlet surface, while voluntarily selecting one of remaining three side faces thereof to be a light outlet surface.

The optical material constituting the light-conductive member 1 is preferably an acrylic resin having a nature of admitting an incoming beam of light and undeviatingly advancing it into the resin. However it may be another material such as a polycarbonate resin having a similar light-transmitting nature.

At the right of the light-conductive member 1, in opposition to the light inlet surface 1a, there are disposed a plurality of (three in this embodiment) light-emitting elements 2a, 2b, 2c composed of light-emitting diodes. The elements 2a to 2c respectively emit rays of light which are arranged through a collimator lens (not shown) into parallel beams which penetrate into the light-conductive member 1 at an incident angle of zero degree, that is, at right angles with respect to the light inlet surface 1a.

On the other hand, at the left of the light-conductive member 1, in opposition to the light outlet surface 1b, there are disposed a plurality of (seven in this embodiment) light-receiving elements 3a to 3g composed of photo diodes.

In FIG. 1, represented by broken lines with arrows between the light-emitting elements 2a to 2c and the light-receiving elements 3a to 3g are respective courses as light-conductive paths 4a to 4h of the beams of light. In this respect, the light-emitting elements 2a to 2c are spaced apart from the light inlet surface 1a and hence interconnected therewith through optical fibers (not shown). Similarly, optical fibers are also used as the interconnection between the light outlet surface 1b and the light-receiving elements 3a to 3g.

There will be described below the inner structure of the light-conductive circuit unit 100 itself.

In FIG. 1, designated at reference characters 5a to 5g are slits of a predetermined width l, respectively; and 6a to 6e are optical switching elements, respectively. The slits 5a to 5g are formed, at various points in the courses of the light beams, through the light-conductive member 1, as air gaps extending in the thickness direction of the member 1, respectively, and arranged to be inclined at an angle of 45° with respect to corresponding ones of the courses of the light beam, so that those courses of the light beams are reflected at 45° by corresponding ones of the slits 5a to 5g, thus being thereby deflected by 90°. In other words, the slits 5a to 5g are each adapted to serve as an optical deflector, respectively.

Such function of optical deflection by the slits 5a to 5g is derived from the fact that, due to the optical material of the light-conductive member 1 having a sufficiently larger index of refraction than air, there is occurring a total reflection of light (beam) at the boundary of the air gap, exemplarily at a boundary surface 1e of the light-conductive member 1 defining the slit 5a. In this respect, within a range of incident angle capable of causing such total reflection, the inclination angle of each of the slits 5a to 5g may be voluntarily deviated from 45° relative to a corresponding one of the courses of light beam, to thereby deflect or bend this course of light beam by a desired angle other than 90°. Moreover, instead of the slits 5a to 5g which are changed "gap" to gaps formed as air gap in the light-conductive member 1, the member 1 may alternately have a plurality of reflection plates, equal in number to the slits, each respectively adapted to serve as an optical deflector. Or otherwise, the slits 5a to 5g may preferably have silver film deposited on the reflection surfaces thereof, to thereby assure effective achievement of intensified reflectivity.

Figure 2A:
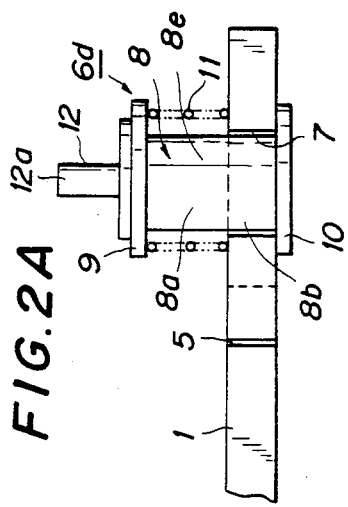
FIG. 2A is a sectional view along line II—II of FIG. 1, showing a state in which an optical switching element is left, as it is forced upwards.
Figure 2B:
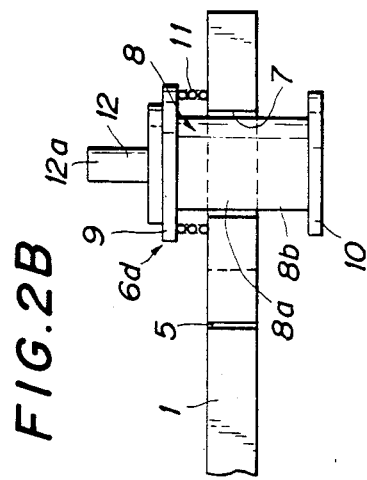
FIG. 2B is a view similar to FIG. 2A, while the optical switching element is pushed down.

As shown in FIGS. 2A and 2B, each of the optical switching elements 6a to 6e, exemplarily the element 6d in these Figures, comprises a prism member 8 fitted in a rectangular through-hole 7 formed in the light-conductive member 1, the prism member 8 having a later described unique form stepped along a plane parallel with the light-conductive member 1. The optical switching elements 6a to 6e schematically shown in FIG. 1 are represented by the element 6d having a side view thereof shown in FIGS. 2A and 2B, and the prism member 8 thereof as viewed from a perspective visual point is given in FIG. 3.

The prism member 8, fitted in the through-hole 7 as described, has fixed thereto, on the top and the bottom, an upper and a lower plate members 9, 10 adapted to serve as flanges, respectively. Between the upper plate member 9 and the upper surface of the light-conductive member 1 is interposed a compressed coil spring 11 for normally urging the plate member 9 and the prism member 8 fixed thereto in the upward direction in FIG. 2A. On the other hand, the plate member 9 has fixed thereon a downwardly operable push member 12 with an upward projection 12a functioning as an actuating part of a pushbutton control of the switching element 6d.

Figure 3:
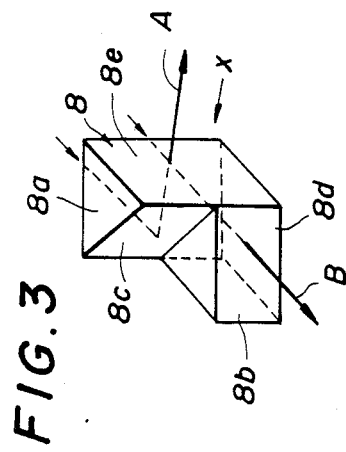
FIG. 3 is a perspective view of a prism member of the optical switching element.

As shown in FIG. 3, the form of the prism member 8 is of a rectangular parallelepiped as partially cut to be stepped to have an upper part 8a of a right-angled triangular prismal form and a lower part 8b of a quadrangular prismal form. Incidentally, the prism member 8 shown in FIGS. 2A and 2B is of a side view thereof seen from the direction X in FIG. 3.

With respect to the prism member 8 shown in FIG. 3, when normally let into one rectangular side face of the right-angled triangular prismal form of the upper part 8a, the beam of light as transmitted from the light-emitting element 2c has a course thereof deflected by 90°, on an oblique side face 8c of the triangular prismal form, to be let out from another rectangular side face 8e thereof in a normal direction A, that is, toward the slit 5g in FIG. 1. When normally let into a corresponding side face of the quadrangular prismal form of the lower part 8b, the light beam from the light-emitting element 2c is directly transmitted, as it advances, without deflections in its course, and let out from an opposite side face 8d of the quadrangular prismal form in a normal direction B, that is, toward the slit 5c in FIG. 1. In other words, in the prism member 8, the upper part 8a has a function of deflecting the course of beam light, and the lower part 8b has a function of causing the light beam to straight-linearly advance.

More particularly, when the optical switching element 6d is put in a position thereof shown in FIG. 2A and hence the lower part 8b thereof is positioned to be just fitted in the through-hole 7 of the light-conductive member 1, then the beam of light from the light-emitting element 2c is undeviatingly advanced the other hand, when the upper part 8a is pushed down to be set in the hole 7, the light beam is deflected to be bent at a right angle. Accordingly, with or without pushbutton operation of the switching element 6d, the course of the light beam from the light-emitting element 2c is selectively determined to be in the direction B or A in FIG. 3, that is, to be selectively connected to such one 4h or 4d among the light-conductive paths 4a to 4h that leads to the slit 5c or 5g, respectively. As a result, the optical switching element 6d is adapted to serve as a switching means of the light transmission route. Such function of the element 6d is analogous to all of the remaining optical switching elements 6a to 6c and 6e, whereas, in the case of the element 6e, the prism member 8 is applied in such a manner that one side face thereof corresponding to the side face 8e in FIG. 3 constitutes a light inlet surface.

In the foregoing arrangement, the light-conductive circuit unit 100 has built therein, for each of the optical switching elements 6a to 6e, a holding member (not shown) adapted to selectively hold the element in position as shown in FIGS. 2A and 2B.

Moreover, besides the upper part 8a as a light transmission route turning portion and the lower part 8b as a light transmission route straight-forwarding portion, the prism member 8 may preferably have another part adapted to interrupt the transmission of light or cut off a light transmission route. According to such modification, there is achieved a prism member permitted to exhibit three different functions: turing, straight-forwarding, and cut-off of the light transmission route. As a result, such as when exemplarily the switching element 6b as modified as described above is employed as a control switch of a fan for a passenger room, there can be achieved a three-staged switching control with an off, a mild, and a strong control positions.

In the light-conductive circuit unit 100, the light-conductive paths 4a to 4h have circuit patterns thereof determined depending on the arrangement of the optical switching elements 6a to 6e as well as of the slits 5a to 5g, while the circuit patterns, which are each respectively defined as a part of the light-conductive member 1 itself, are invisible, though actually present.

As shown in FIG. 1, the three beams of light as projected from the light-emitting elements 2a to 2c and received through the light inlet surface 1a are transmitted through the light-conductive paths 4a to 4h and let out, at the light outlet surface 1b, as a set of seven optical signals S1 to S7 to be input to the light-receiving elements 3a to 3g, the optical signals S1 to S7 having alternatively selectable "on" and "off" signal states, respectively.

For example, while the switching elements 6a and 6b are set in beam direction holding positions thereof, the optical signals S1 to S7 have such signal states as described below.

The light beam from the light-emitting element 2a is admitted to straight-linearly pass the switching elements 6a, 6b, thus leading to the switching element 6c, while it is kept from advancing along the paths 4c, 4d, so that the signal S6 is kept "off". Additionally, when the switch element 6c is operated into a beam direction turning position thereof, the signal S1 becomes "off" and the signal S2 becomes "on", whereas, while the element 6c is set in a beam direction holding position thereof, the signals S1, S2 are in "on" and "off" states, respectively. The states of the signals S3, S4 and those of the signal S5, S7 depend on the switch position of the switching element 6e and that of the switching element 6d, respectively.

Incidentally, the light-conductive paths 4a to 4h are patterned to be parallel with and/or perpendicular to each other; exemplarily, the path 4g is parallel with the path 4h, and the path 4e is perpendicular to the path 4d. Any two light-conductive paths neighboring or crossing each other are designed to be free from optical interference therebetween. In this respect, to further ensure noninterference with light in the path, as well as for the protection against optical disturbances from outside, a relatively long path portion 4d' is provided therealong with a pair of guide slits 5h, 5i formed, at the transversely inner and outer sides thereof, to be cut through in the thickness direction of the light-conductive member 1.

According to the present embodiment, the light-conductive circuit unit 100 comprises the single light-conductive member 1 which has a designed light-conductive circuit substantiated inherently by no more than forming at necessary points the respective slits 5a to 5g as well as holes 7 to be fitted with the optical switching elements 6a to 6e, thus permitting an optical circuit, even of a complicated pattern, to be constituted with great ease. Moreover, the light-conductive member 1, as a single body capable of being moulded with any desired form, is easy to manufacture and favorably adapted for mass production. Particularly, with the presence of the inherently required fitting holes 7 for the switching elements 6a to 6e, the member 1 to be moulded as a unit base is able to achieve simplification as well as facilitation in the assembly work of the light-conductive circuit unit 100.

Further, in the light-conductive circuit unit 100, necessary circuit elements thereof including the switching elements 6a to 6e and the slits 5a to 5g are formed to be substantially integral with the unit base 1 constituting the light-conductive paths 4a to 4h, thus effectively preventing the light leakage which otherwise would occur at connecting points between such circuit components, so that a sufficient transmitting efficiency of light can be secured with respect to the light-conductive circuit unit 100 itself as well as with respect to the entirety of an optical signal transmission system having employed the circuit unit 100.

Incidentally, in a modified example of the foregoing embodiment, exemplarily the light-emitting element 2c may be constituted as a light source adapted to emit rays of light having a plurality of different wavelengths. In such modification, the optical switching element 6a may preferably have inlaid, in the lower part 8b of the prism member 8, a reflection plate adapted to reflect no more than those rays of light in a light beam transmitted thereto which have a certain predetermined wavelength, the reflection plate being inclined at an angle of 45° with respect to the course of the light beam, to thereby deflect or turn by 90° the rays of light of the predetermined wavelength. According to such modification, the light-conductive circuit unit 100 may be advantageously adapted for a multiplex optical signal transmission system of a multi-wavelength type.

Figure 4:
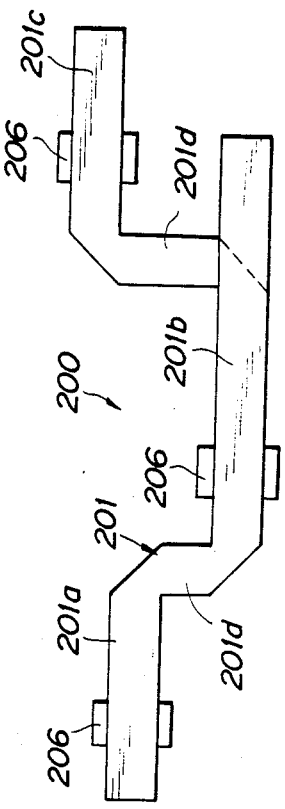
FIG. 4 is a side view of a light-conductive circuit unit according to another preferred embodiment of the present invention.

There will be described hereinbelow a second embodiment of the present invention, with reference to FIG. 4 which is a side view of a light-conductive circuit unit 200 according to this embodiment.

Different from the first embodiment in which the light-conductive member 1 is of a flat plate form as a whole, the second embodiment provides a light-conductive member 201 of a three-dimensional figure formed to be channel-like in the side view with three flat portions 201a, 201b, 210c positioned at different levels from each other. The respective flat portions 201a to 201c have light course switching means thereof consisting of optical switching elements 206 and a plurality of slits (not shown). The switching elements 206 as well as the slits being of such a type that is analogous to the type described in the first embodiment. Among the flat portions 201a to 201c, the upper two 201a, 201c, extending at higher levels than the remaining one 201b, are interconnected with the latter 201b through a pair of vertically standing portions 201d for the conduction of light therebetween, respectively. With such structure, the circuit unit 200 is advantageously permitted to have an optical circuit thereof scaled up, thereby achieving increased flexibility in the selection for lay-out of operating means of the switching elements 206 to be adequately located in accordance with available space for the installation of the unit 200.

As will be understood from the foregoing description, according to the present invention, an optical circuit to be used in an optical signal processing system is integrally constituted as a unit comprising a single light-conductive member having a plurality of reflection parts as well as a plurality of optical switching elements, thereby achieving facilitation in the manufacture of complicated optical circuits to be made compact, while permitting like optical circuits to be mass-produced with like characteristics. Moreover, possible integration of associated light-conductive paths into a single member allows the number of optical connections therebetween to be minimised, thereby raising the light transmission efficiency of optical circuit.

Further, it also will be comprehended from the foregoing description of the first and the second embodiments that, according to the present invention, there is provided a light-conductive circuit unit comprising, when most simplified in constitution, besides necessary light-conductive paths, (i) an arrangement having, for a single light source, a single optical switching element and a single light course turning slit or (ii) an arrangement having a pair of optical switching elements each respectively provided for one of a pair of light sources. Exemplarily, the former (i) corresponds to an arrangement including, for the light-emitting element 2a, the switching element 6c and the slit 5b (cooperating with each other to supply the optical signals S1, S2 to the light-receiving elements 3a, 3b); and the latter (ii), to an arrangement including the switching elements 6c, 6d provided for the light-emitting elements 2a, 2c, respectively (to supply the optical signals S1, S5 to the light-receiving elements 3a, 3e, such that the light beam from the light-emitting element 2c is permitted to straight-linearly advance to reach the light-receiving element 3e when the switching element 6d is set in the light course holding position, on the assumption that the slits 5c, 5e, which are redundant in such arrangement, were eliminated and hence the beam of light of the signal S5 and the element 3e were put in place of that of the signal S3 and the element 3c, respectively).

Still more, the configuration itself of the light-conductive member 1 or 201 as a unit base, that is, as a substrate of the circuit unit is not limited to the flat plate or channel-like form, but may have a voluntary form as practicable.

Although there have been described what are at present considered to be the preferred embodiments of the invention, it will be understood that the present invention may be embodied in other specific forms without departing from the spirit or essential characteristics thereof. The present embodiments are therefore to be considered in all respects as illustrative and not restrictive. The scope of the invention is indicated by the appended claims rather than by the foregoing description.

We claim:

1. A light-conductive circuit unit (100, 200) comprising:
   a substrate (1; 201) made of an optical material;
   said substrate (1; 201) having a light inlet surface (1a) for letting in a beam of light from a light source (2a to 2c), a light outlet surface (1b) for letting out a beam of light to a light-receiving element (3a to 3g), and a light-conductive path (4a to 4h) constituted with an internal part of said substrate (1; 201) to conduct rays of light from said light inlet surface (1a) to said light outlet surface (1b);
   light deflecting means and optical switching means each respectively disposed in said light conductive path; and
   said light deflecting means comprising a slit formed in said substrate.

2. A light-conductive circuit unit according to claim 1, wherein:
   said optical switching means comprises a prism member (8) fitted in said light-conductive path (4a to 4h) of said substrate (1) in a selectively movable manner relative thereto such that a light direction holding portion (8b) of said prism member and a light direction turning portion (8a) of said prism member are selectively positionable in said light-conductive path (4a to 4h) of said substrate (1).

3. A light-conductive circuit unit according to claim 2, wherein:
   said light conductive path (4a to 4h) includes a plurality of branched parts; and
   said optical switching means is used to selectively transmit said rays of light through one of said branched parts of said light-conductive path (4a to 4h).

4. A light-conductive circuit unit according to claim 1, further comprising:
   a guide slit (5h, 5i) formed, in said substrate (1), alongside said light-conductive path (4d').

* * * * *

UNITED STATES PATENT AND TRADEMARK OFFICE
CERTIFICATE OF CORRECTION

PATENT NO. : 4,674,828
DATED : June 23, 1987
INVENTOR(S) : Fumitaka TAKAHASHI et al.

It is certified that error appears in the above-identified patent and that said Letters Patent is hereby corrected as shown below:

```
Column 4, lines 5-6, delete "change 'gap' to gaps";
          line 6, after "air" change "gap" to --gaps--.
Column 5, lines 2-3, after "advanced" insert --; on--.
Column 7, line 6, change "210c" to --201c--;
          line 36, correct the spelling of --minimized--.
```

Signed and Sealed this

Twenty-fourth Day of November, 1987

Attest:

DONALD J. QUIGG

*Attesting Officer*     *Commissioner of Patents and Trademarks*